April 13, 1937. A. WINTHER 2,077,194
VEHICULAR TRANSMISSION SYSTEM
Filed Oct. 6, 1934 3 Sheets-Sheet 1
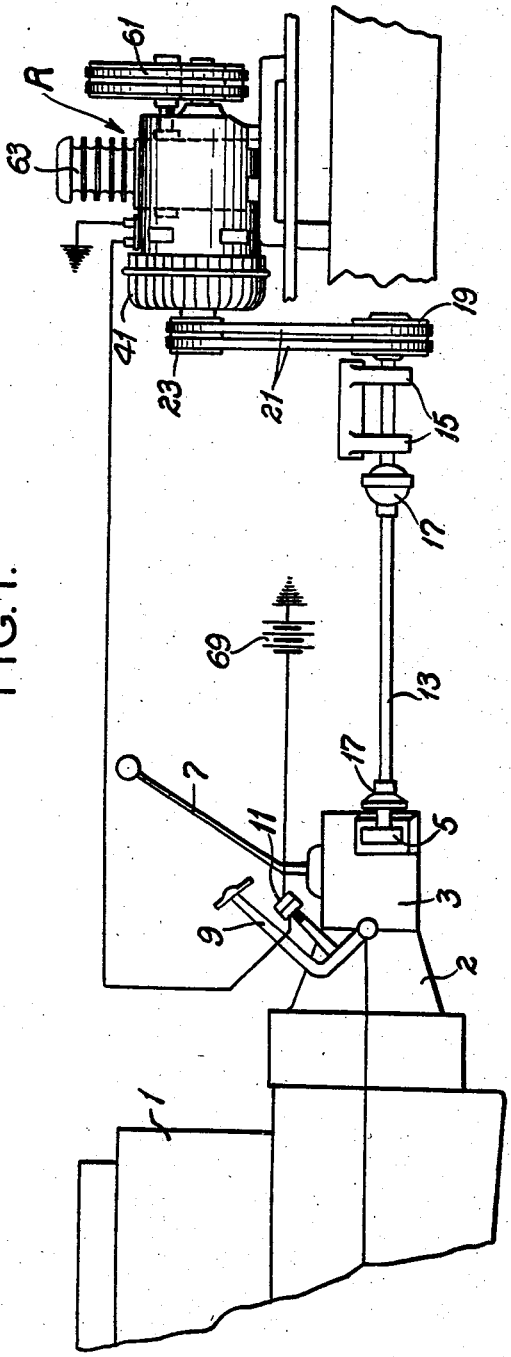
FIG. I.
Anthony Winther
Inventor.
Delos G. Haynes
Attorney.

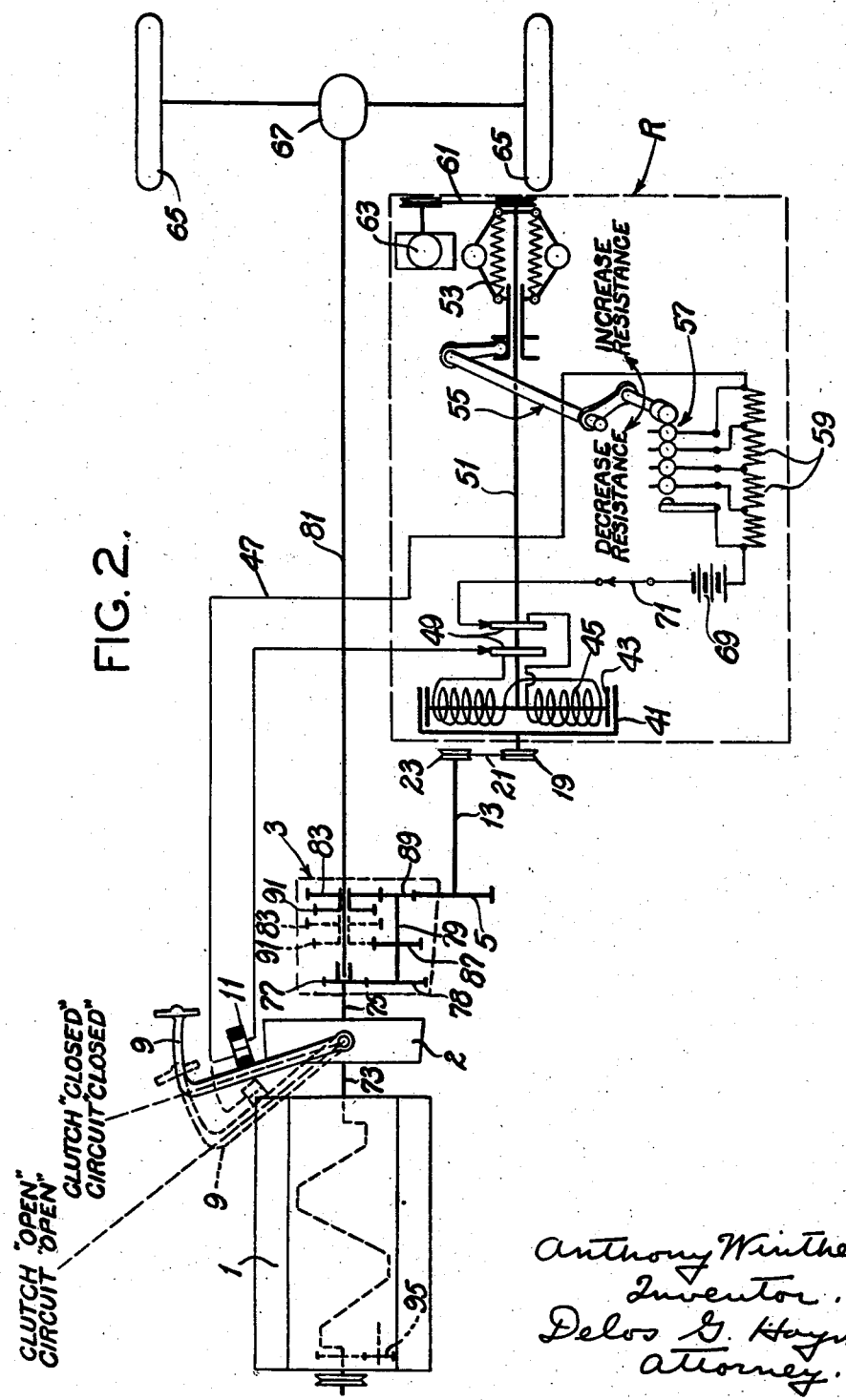

April 13, 1937.	A. WINTHER	2,077,194
VEHICULAR TRANSMISSION SYSTEM
Filed Oct. 6, 1934	3 Sheets-Sheet 3
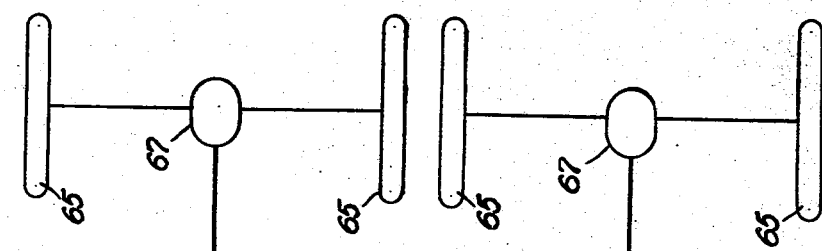
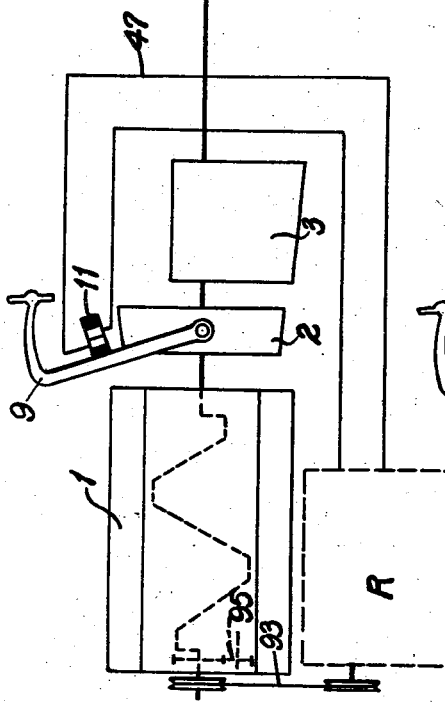
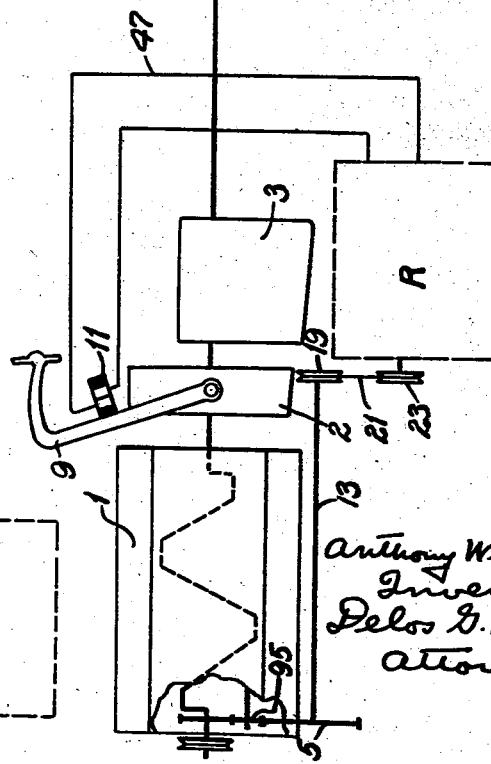

Patented Apr. 13, 1937

2,077,194

UNITED STATES PATENT OFFICE 2,077,194

VEHICULAR TRANSMISSION SYSTEM

Anthony Winther, Kenosha, Wis., assignor to Martin P. Winther, Waukegan, Ill., as trustee Application October 6, 1934, Serial No. 747,159

15 Claims. (Cl. 74—11)

This invention relates to vehicular transmission systems, and with regard to certain more specific features, to vehicular transmission systems for driving a refrigerator or like compressor from the customary propulsion transmission and/or prime mover of the vehicle.

The invention is a continuation-in-part of the invention set forth in my United States patent application, Serial Number 736,506, filed July 23, 1934, for Vehicular transmission system.

Among the several objects of the invention may be noted the provision, in a vehicular drive and transmission system a prime mover, a clutch, a propulsion gear transmission, a propulsion drive shaft to the road wheels, a refrigerator compressor, and driving means for said compressor comprising a power take-off from the propulsion transmission and/or the prime mover, and means for reducing the inertial and/or resistance effect of the compressor driving means when the prime mover is disconnected, as by throwing open the clutch, so that no drag is thereby imposed on the gear transmission and/or prime mover, and which would otherwise make gear shifting difficult. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention.

Fig. 1 is a diagrammatic side elevation of one form of the invention;

Fig. 2 is a more detailed layout of the apparatus shown in Fig. 1;

Fig. 3 is a diagrammatic view illustrating a second form of the invention; and,

Fig. 4 is a view similar to Fig. 3 showing a third form of the invention.

Similar reference characters indicate corresponding parts throughout the several views of the drawings.

Refrigerator compressors and like driven objects have heretofore been provided in vehicles, and have been driven by a power take-off from the gear transmission of the vehicle through a speed control, or from the prime mover direct. This power take-off has been disadvantageous, being at all times directly or indirectly coupled to the gears of the transmission, or to the prime mover, the compressor and driving means therefor having a considerable inertia and/or resistance.

In the course of normal operation of the vehicle, when the main clutch is disengaged in order to shift gears, the power take-off acting under the inertia of the compressor and driving means therefor, (1) under some design conditions, continues to rotate certain gears of the transmission, rendering the shifting of gears difficult; and (2) under other conditions of design, the gears of the transmission may upon shifting be unduly reduced in speed.

For an example of the first condition, if the operator is driving along the road in second gear (which means that the engine is running at a high enough speed to be delivering full regulating speed to the compressor through a speed control) and he attempts to shift to high gear, the action of the speed control driven shaft and of the refrigerating compressor tends to prolong the rotation of the power take-off shaft, and hence to prolong rotation of the gears in the gear case, even if the operator disengages the clutch. The result is that the speed change gears in the gear case are rotating relatively differently than they would if the compressor and its drive were not present. This difference causes difficulty in shifting the change speed gears for meeting ordinary road requirements, resulting in clashing and the like under what would otherwise be a normal shifting action.

If the compressor be driven directly from the prime mover, the same effect is exerted upon the prime mover, so that after the gears are shifted in the transmission and the main clutch reclosed, an undesirably high relative movement exists between the driving and driven members of the clutch which interferes with the smoothness of operation. Or, the engine may conceivably be stalled upon shifting, under certain conditions.

The present invention eliminates the above difficulties by cutting off the field excitation of the driving means and speed control for the compressor when the operation disengages the main clutch, thereby removing the entire load from the power take-off shaft or from the prime mover, as the case may be, whenever the clutch pedal is depressed.

Referring now more particularly to Figs. 1 and 2, numeral 1 indicates the engine or prime mover, 2 the clutch, 3 the gear case, 5 the power take-off to the refrigerator unit, 7 the usual gear shift handle, 9 the usual clutch pedal, and 11 an electric switch. The switch 11 is arranged so that it is open when the clutch pedal 9 is depressed (to disengage the clutch 2) and closed when the clutch pedal 9 is in normal clutch closing position. As the drawings show, the switch 11 opens immediately upon the first movement of the pedal 9, that is, during its movement of play just prior to actual clutch opening. As is known, the usual clutch pedal has substantial play movement prior to actual clutch opening movement.

Numeral 13 indicates a jack shaft, suitably carried in bearings 15 and provided with universal joints 17. The power take-off 5 drives one end of the shaft 13, while to the other end of the jack shaft is affixed a grooved pulley 19 which, through belts 21, drives a similar pulley 23 on an inductor drum 41. As shown, the inductor drive 41 cooperates electromagnetically with a field member 43 having coils 45 on its poles, said coils 45 being energized by means of a circuit 47 which includes said switch 11. Suitable slip rings 49 serve to provide the electrical path between the moving coils 45 and the circuit 47.

From the above it will be understood that the inductor drum 41 is a driving member and inductively drives the driven field member 43. Attached to said field member 43 is a driven shaft 51 upon which is mounted a centrifugal governor 53, the latter controlling, according to speed, a rocker mechanism 55 which acts successively upon shunt contacts 57.

The contacts 57 shunt a series of resistances 59 in said circuit 47. Upon an increase in speed of the shaft 51, the shunt contacts 57 are gradually removed from the circuit, thus inserting the resistances 59 so as to weaken the field strength of the coils 45 and hence increasing the slip between the driving member 41 and the driven member 43.

On the other hand if the speed decreases, the shunt contacts 57 are inserted into the circuit 47, thus gradually shunting out the resistances 59 and increasing the field strength of the driven member 43 so as to reduce the slip between members 41 and 43. Thus, regulation of the speed of shaft 51 is obtained under varying velocities of the shaft 13.

The driven shaft 51, by means of a belt drive 61 drives a compressor 63 which comprises part of the refrigerating system on the vehicle.

The road wheels of the vehicle are indicated at numeral 65, the same being driven through a suitable final drive 67 from said gear transmission 3.

The circuit 47 is energized by means of battery 69 and has therein a manually operable switch 71 for cutting into and out of operation the refrigerating system.

Other details and refinements in connection with the refrigerator, governor drive may be found in my United States patent applications, Serial Number 726,072, filed May 17, 1934, for Refrigerating apparatus, and my Patent Number 1,982,461, dated November 27, 1934, for Electric governor.

It will be seen that, when the operator of the vehicle depresses the clutch pedal 9 to open clutch 2, flow of current to the field of the speed control 33 is cut off prior to clutch opening, thus cutting off the field excitation of the speed control and therefore removing substantially the entire load from the power take-off shaft 13 before the clutch is actually opened. Shifting of the gears in the transmission 3 may thereafter be effected without difficulty.

It will be seen that without the provision of switch 11 articulated with the clutch mechanism 2, 9, that the inertia of the refrigerating unit, designated generally at R, will function deleteriously. The reasons for this are that the clutch 2 has a driving shaft 73 connected to the crank shaft of the prime mover 1 and a driven shaft 75. The latter carries a gear 77 which meshes with a gear 78 on a jack shaft 79, the latter rotating according to the rotation of the gear 77. The drive shaft 81 of the vehicle is driven from said jack shaft 79 by gear 89 and a splined gear 83. The jack shaft 79 comprises a nest with gears 78, 89 and 87.

When it is desired to shift gears, the clutch pedal is pressed, thus disengaging shaft 75 from shaft 73. Then a gear such as 83 is shifted to the dotted-line position shown, and another splined gear such as 91 is shifted into mesh with a gear such as 87. While this shift is being made, the nest of gears 78, 87 and 89 is free, and, if connected with the power take-off 5 is under control of said power take-off. The same is true when a direct-drive connection is made with gear 77 in the known manner.

If the inertia of the refrigerator unit R is high, the rotation of the gears 77, 78, 87 and 89 will be unduly prolonged, so that proper meshing for subsequent speed cannot be made. On the other hand, should the inertia be unduly low, the gears 78, 87 and 89 will be unduly loaded and decelerated, thereby also to make shifting difficult. It would very rarely occur that the design of the unit R would exactly coincide with the requirements for proper gear shifting. By means of the present invention most of the deleterious effects of the action of the unit R is eliminated from the gear case and shifting may be accomplished in the usual manner. It is to be also remembered in this connection that the gear boxes themselves are designed so that the shifting is easy and their constants of operation should not be substantially changed.

It will be understood that the clutch may be of the automatically operating type (such as a vacuum clutch) in which event the switch 11 is not directly connected to the pedal 9, which does not move when the clutch is automatically disengaged, but to the element which actually effects the movement of the clutch, so that the same ultimate effect is obtained. But, just as clutch pedal 9 is arranged so that a slight initial movement of the same before clutch opening opens switch 11, so will the automatic clutch open the switch during play movement. This is because all clutch operating means and pedals have a reserve, lost-motion necessary to prevent oversensitive adjustment of the clutch which would otherwise make operation of the vehicle dangerous. It is also to be understood that the showing of the various elements whose structures known per se, are shown diagrammatically and that it is the new combination of these that is herein considered to be new.

Referring now to Fig. 3, it will be seen how the unit R may be driven from the crank shaft of the prime mover 1 by means of a belt drive 93, the circuit 47 to said unit R being under control of said switch 11.

In Fig. 4 is shown a connection wherein the power take-off 5 is from a timing gear or the like 95 in the engine, the same delivering energy to the jack shaft 13 and thence to the unit R by way of the drive 21.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a vehicle, a prime mover, at least one driving road wheel, a mechanical connection between said prime mover and said wheel, an openable clutch in said connection, a power take-off delivering energy from said prime mover, a loaded driven means receiving said energy by way of said power take-off, and means automatically responsive to opening of said clutch for removing the load from said driven means only when the clutch is moved to be disengaged.

2. In a vehicle, a prime mover, at least one driving road wheel, a mechanical connection between said prime mover and said wheel, an openable clutch in said connection, a power take-off connected to the prime mover otherwise than through said clutch and delivering energy from said prime mover, a driven means receiving said energy by way of said power take-off, and means automatically responsive to opening of said clutch for removing the load from said driven means only when the clutch is moved to be disengaged.

3. In combination with a vehicle including a prime mover, a clutch, a gear transmission, and a driven means empowered by a power take-off from the gear transmission, means for removing the load of said driven means from the gear transmission when said clutch is disengaged comprising an electric circuit including a portion of said driven means, and a switch in said circuit, said switch being actuated to open circuit position by the disengaging movement of said clutch.

4. In combination with a vehicle including a prime mover, a clutch, a gear transmission, a refrigerating compressor, an electrical speed control mechanism including a field, and a power take-off from said gear transmission driving said compressor through said speed control means, means operable upon disengagement of said clutch to disempower the speed control mechanism and hence to remove the load of said compressor from said gear transmission.

5. In combination with a vehicle including a prime mover, a clutch, a gear transmission, a refrigerating compressor, an electrical speed control mechanism including an electromagnetic field, and a power take-off from said gear transmission driving said compressor through said speed control means, means operable upon disengagement of said clutch to disempower the speed control mechanism and hence to remove the load of said compressor from said gear transmission comprising an electric circuit including the field of said speed control mechanism, and a switch in said circuit, said switch being mechanically actuated to open circuit position by the disengaging movement of said clutch, whereby the flow of current to the field of said speed control mechanism is interrupted.

6. In combination with a vehicle including a prime mover, a clutch, a gear transmission, a refrigerating compressor, an electrical speed control mechanism including an electromagnetic field, and a power take-off connected with said prime mover and driving said compressor through said speed control means, means operable upon disengagement of said clutch to disempower the speed control mechanism and hence to remove the load of said compressor from said gear transmission comprising an electric circuit including the field of said speed control mechanism, and a switch in said circuit, said switch being mechanically actuated to open circuit position by the disengaging movement of said clutch, whereby the flow of current to said speed control mechanism is interrupted.

7. In a vehicle having a prime mover, a road wheel, and a driving connection between the prime mover and the road wheel having a clutch therein, comprising an energy consuming unit on the vehicle, a drive for said unit comprising a power take-off connected with said prime mover, a driving member connected with said power take-off, a driven member connected with said unit, and an electrical circuit effecting an electromagnetic connection between said driving and driven members, and a switch in said circuit adapted to be closed upon closing of the clutch and to be opened upon opening of the clutch, whereby said electromagnetic connection is accordingly effected or broken.

8. In a vehicle having a prime mover, a road wheel, a driving connection between the prime mover and the road wheel having a clutch therein, comprising an energy consuming unit on the vehicle, a drive for said unit comprising a power take-off connected with said prime mover, a driving member connected with said power take-off, a driven member connected with said unit, and an electrical circuit effecting an electromagnetic connection between said driving and driven members, and a switch in said circuit adapted to be closed upon closing of the clutch and to be opened upon opening of the clutch, whereby said electromagnetic connection is accordingly effected or broken, said connection between the power take-off and the prime mover being through said transmission.

9. In a vehicle having a prime mover, a road wheel, and a driving connection between the prime mover and the road wheel having a clutch therein, comprising an energy consuming unit on the vehicle, a drive for said unit comprising a power take-off connected with said prime mover, a driving member connected with said power take-off, a driven member connected with said unit, and an electrical circuit effecting an electromagnetic connection between said driving and driven members, and a switch in said circuit adapted to be closed upon closing of the clutch and vice versa, whereby said electromagnetic connection is accordingly effected or broken, said connection between the power take-off and the prime mover being made directly to said prime mover.

10. In a vehicle having a prime mover, a road wheel, a driving connection between the prime mover and the road wheel having a clutch therein, comprising an energy consuming unit on the vehicle, a drive for said unit comprising a power take-off connected with said prime mover, a driving member connected with said power take-off, a driven member connected with said unit, and an electrical circuit effecting an electromagnetic connection between said driving and driven members, and a switch in said circuit adapted to be closed upon closing of the clutch and vice versa, whereby said electromagnetic connection is accordingly effected or broken, said connection between the power take-off and the prime mover being directly connected to said prime mover by way of a geared connection.

11. In a vehicle having a prime mover, a road wheel, a driving connection between the prime mover and the road wheel having a clutch therein, comprising an energy consuming unit on the vehicle, a drive for said unit comprising a power take-off connected with said prime mover, a driving member connected with said power take-off, a driven member connected with said unit, and an electrical circuit effecting an electromagnetic connection between said driving and driven members, and a switch in said circuit adapted to be closed upon closing of the clutch and vice versa, whereby said electromagnetic connection is accordingly effected or broken, said connection between the power take-off and the prime mover being directly connected to said prime mover by way of a belted connection.

12. In a vehicle, a prime mover, at least one driving road wheel, a mechanical connection between said prime mover and said wheel, a clutch in said connection, means to operate said clutch, a power take-off delivering energy from said prime mover, a loaded driven means receiving said energy by way of said power take-off, and means for removing said load by the initial movement of said clutch operating means prior to the disengagement of said clutch.

13. In a vehicle, a prime mover, at least one driving road wheel, a mechanical connection between said prime mover and said wheel, a clutch in said connection, means to operate said clutch, a power take-off delivering energy from said prime mover, a loaded driven means receiving said energy by way of said power take-off, and means for removing said load by the initial movement of said clutch operating means independent of the disengagement of the clutch.

14. In a vehicle, a prime mover, at least one driving road wheel, a mechanical connection between said prime mover and said wheel, a clutch in said connection, means for operating said clutch, a power take-off delivering energy from said prime mover, loaded means driven by said power take-off, an electromagnetic driving connection between said loaded driven means and the power take-off, an electric circuit for maintaining said electromagnetic connection, and means for disconnecting said loaded driven means from the prime mover by breaking said electromagnetic connection through interruption of said circuit in response to movement of the clutch operating means.

15. In a vehicle, a prime mover, at least one driving road wheel, a mechanical connection between said prime mover and said wheel, a clutch in said connection, means for operating said clutch, a power take-off delivering energy from said prime mover, loaded means driven by said power take-off, an electromagnetic driving connection between said loaded driven means and the power take-off, an electric circuit for maintaining said electromagnetic connection, and means for disconnecting said loaded driven means from the prime mover by breaking said electromagnetic connection through interruption of said circuit in response to movement of the clutch operating means before said clutch operating means effects the disengagement of said clutch.

ANTHONY WINTHER.